V. L. FISHER.
REEL ATTACHMENT FOR MOWING MACHINES.
APPLICATION FILED MAY 25, 1918.
1,376,268.
Patented Apr. 26, 1921.
2 SHEETS—SHEET 2.
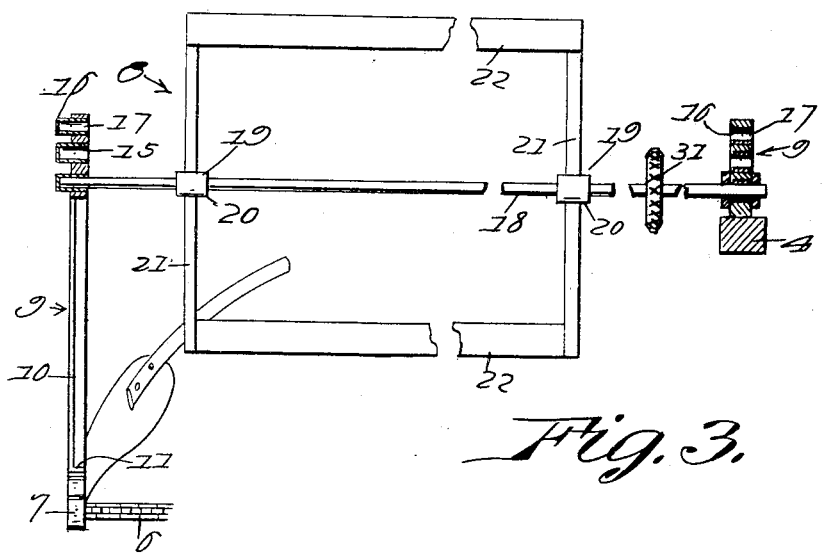
Fig. 3.
Fig. 5.
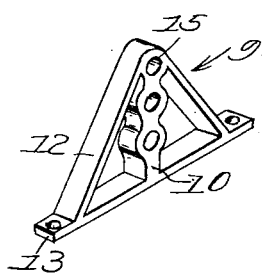
Fig. 4.
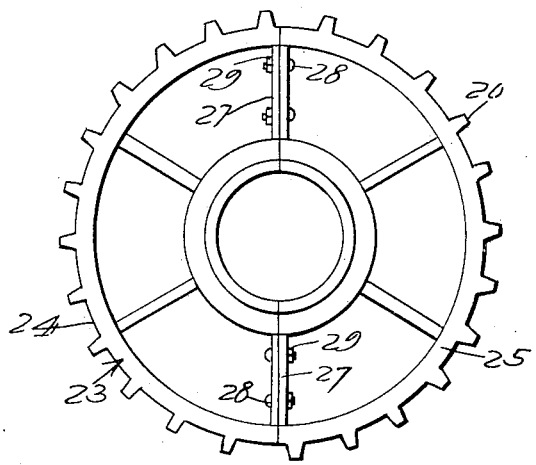
Inventor
V. L. Fisher,
By
Attorney

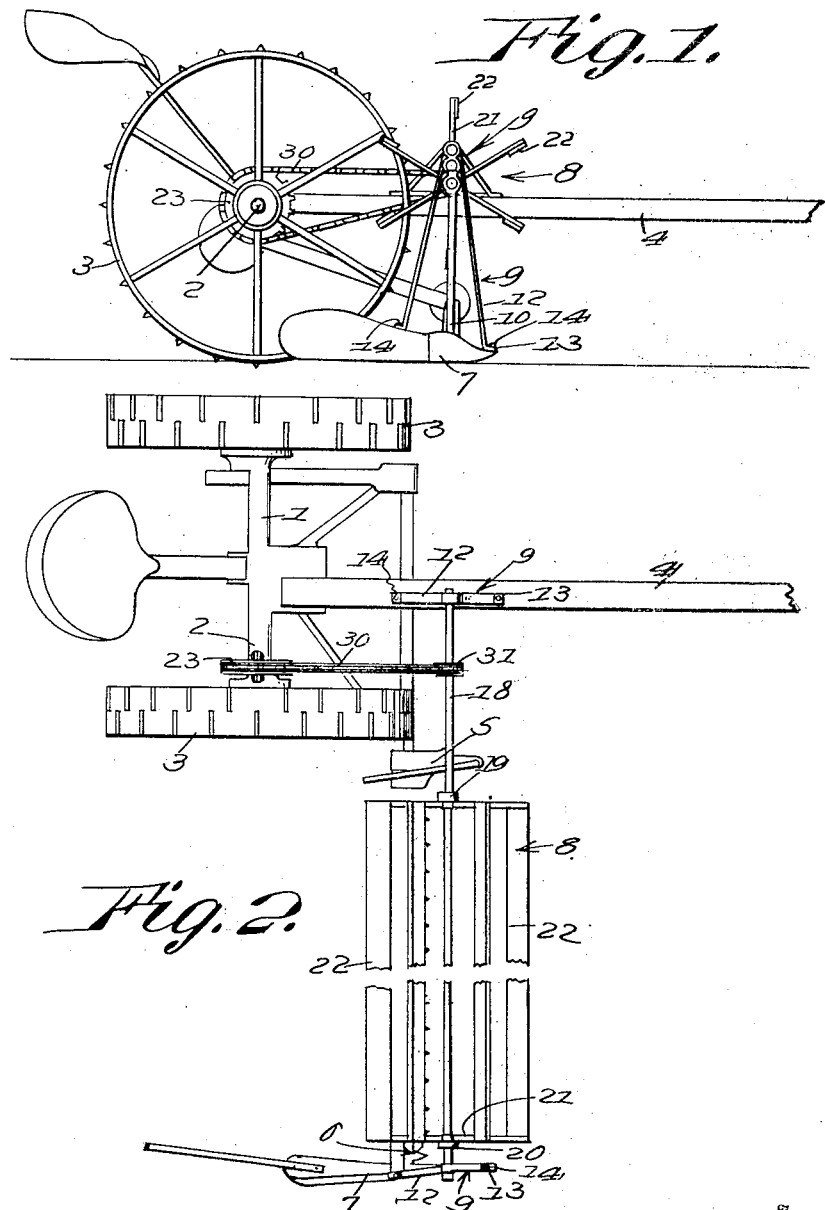

UNITED STATES PATENT OFFICE.

VIRDIE L. FISHER, OF FAIRPLAIN, WEST VIRGINIA.

REEL ATTACHMENT FOR MOWING-MACHINES.

1,376,268.    Specification of Letters Patent.    Patented Apr. 26, 1921.

Application filed May 25, 1918. Serial No. 236,496.

*To all whom it may concern:*

Be it known that I, VIRDIE L. FISHER, a citizen of the United States of America, residing at Fairplain, in the county of Jackson and State of West Virginia, have invented new and useful Improvements in Reel Attachments for Mowing-Machines, of which the following is a specification.

This invention comprehends generally improvements in that class of inventions known as harvesters and more particularly has reference to a reel attachment for mowing machines.

It is the primary aim and object of the present invention to provide a device of the above mentioned character designed to be connected above the cutting means of a mowing machine operably connected with the machine so as to operate simultaneously therewith to assure of the positioning or the supporting of grain or grass in the proper position with respect to the cutting means thus assuring of an effective cutting action.

More particularly the present invention consists in the provision of a reel rotatable above the cutting means of a mowing machine and designed for assuring of the cutting of short grain or grass and for also cutting the grass in windy weather.

It is the more specific object of the present invention to provide improved means for rotatably and adjustably supporting the reel shaft and by mounting the reel on the machine the employment of additional farm hands for straightening the grass with a rake is obviated.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes may be made without departing from the principle of operation of the various parts.

The invention is clearly illustrated in the accompanying drawings, in which:

Figure 1 is a side elevation of the invention applied in position on a mowing machine.

Fig. 2 is a top plan view thereof.

Fig. 3 is a fragmentary longitudinal sectional detail showing means for mounting the reel shaft, and Fig. 4 is a perspective detail of one of the supporting brackets for the shaft.

Fig. 5 is a side elevational view of the sprocket employed for operatively connecting the reel attachment with one of the supporting wheels of a mowing machine.

Similar characters of reference are employed in all of the above described views to indicate corresponding parts.

Referring now, more particularly, to the accompanying drawings there is provided a mowing machine of any desired type and which for the purpose of illustration may be said to consist generally of a frame 1 in which is mounted the main axle 2 while journaled on the axle are ground supporting wheels 3. Projecting forwardly from the frame is a tongue 4 while operably connected to one side of the frame slightly in advance of one of the wheels 2 is an inner shoe 5. The cutting means generally indicated by the numeral 6 is operably connected to the shoe while the grain or parting board 7 is connected to the outer end of the cutting means. Connected to the parting board 7, the tongue 4 and one of the wheels 3 is the improved reel attachment indicated in its entirety by the numeral 8.

In the present instance the improved reel attachment may be said to consist of a pair of supports each of which is indicated in its entirety by the numeral 9. Each support consists of a standard 10 which terminates its lower end in a foot 11, while integral with the top of the standard and projecting downwardly therefrom are inclined braces 12 on the lower ends of which are formed feet 13. The feet 11 and 13 respectively of the standard and braces are connected to the upper edge of the parting board 7 and the upper surface of the tongue 4 by suitable fasteners 14 so that the supports 9 are arranged in opposed relation with each other. On one of the standards 9 is formed near the upper end in a series of vertical openings 15 while also formed integral with the standards and alining with the openings are bearing sleeves 10 arranged in opposed relation with the bearing sleeves on the opposite standard as in the drawings. Each sleeve is formed with an opening 17 for a purpose that will hereinafter become apparent.

A reel shaft 18 has its respective ends journaled in any of the opposed bearing sleeves 16 while connected to the shaft above the cutting means is a reel which consists of two spaced spiders 19 each spider consists of a hub 20 and a series of rotating and inclined arms 21 arranged in opposed relation to the inclined arm of the other spider. Paddles 22 have their respective ends rigidly connected to the opposed arms of the spiders and are designed to act upon the grain during rotation so as to properly position the grain or grass with respect to the cutting means and thus assure of an effective cutting action regardless as to whether the grass is in a tangled state or whether it is windy. By this arrangement it is apparent that it is unnecessary to employ farm hands for the purpose of straightening the grass in advance of the cutting means of the mowing machine.

For the purpose of operably connecting the shaft 18 with the main axle a sectional sprocket wheel indicated in its entirety by the numeral 23 is employed. This wheel may be said to consist of two substantially semi-circular sections 24 and 25, the periphery of its curved edges being formed with teeth 26 while the straight edges are formed with flanges 27 designed to be fitted about the hub of one of the supporting wheels 3 and arranged in abutting relation with respect to each other. Suitable fastening means such as bolts 28 and nuts 29 are employed for clamping the sections 24 and 25 in a substantially rigid position with respect to the said wheel 3. A chain 30 is trained about the sectional wheel 23 and also about another sprocket wheel 31 carried by the shaft 18. Of course, by this arrangement it is apparent that during forward movement of the mower rotary motion will be transmitted from the wheel 3 to the shaft 18 through the instrumentality of the sprocket wheels 23 and 31 and the wheel 3 and inasmuch as the reel is rigid with the shaft the latter will be rotated so that the paddles 22 thereof will act upon the grass or grain with a view to straightening it to consequently permit of the effective cutting of the grain by the cutting means 6 of the mowing machine.

By the provision of the bearing sleeve it is apparent that the shaft 18 can be arranged in various positions of vertical adjustment and incidentally by the provision of the openings 17 in the sleeves 16 the attendant is enabled to lubricate the ends of the shaft 18 to facilitate the rotary motion thereof.

Having thus fully described the invention what is claimed and desired to be secured by Letters Patent is:

A reel attachment for mowing machines comprising a pair of supports each of which embodies a standard and braces formed integral therewith at the top, the said braces being inclined downwardly and diverging and terminating in attaching feet, means for securing the attaching feet to a mowing machine so as to position the said supports in spaced relation to each other, the standard of each support being formed near its upper end with a series of superposed openings constituting bearings, the bearing openings in one standard alining with the corresponding openings in the other, a shaft journaled in alined openings in the standard, the shaft being mountable in any pair of bearing openings in the two stems whereby its height from the ground may be varied, a reel carried by and rotatable with the shaft, the reel being designed for positioning over the cutting means of the mowing machine, and means for transmitting motion to the shaft from the mowing machine on which the attachment is carried.

In testimony whereof I affix my signature.

VIRDIE L. FISHER.